United States Patent
Kolb et al.

(10) Patent No.: US 10,765,112 B2
(45) Date of Patent: Sep. 8, 2020

(54) PESTICIDAL MICROCAPSULES WITH A SHELL MADE OF TETRAMETHYLXYLYLENE DIISOCYANATE, CYCLOALIPHATIC DIISOCYANATE, AND ALIPHATIC DIAMINE

(71) Applicant: BASF SE, Ludwigshafen am Rhein (DE)

(72) Inventors: Klaus Kolb, Schifferstadt (DE); Wolfgang Gregori, Ludwigshafen (DE); Ulrich Steinbrenner, Neustadt (DE); Liliana Parra Rapado, Offenburg (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/737,020

(22) PCT Filed: May 10, 2016

(86) PCT No.: PCT/EP2016/060397
§ 371 (c)(1),
(2) Date: Dec. 15, 2017

(87) PCT Pub. No.: WO2016/202500
PCT Pub. Date: Dec. 22, 2016

(65) Prior Publication Data
US 2018/0168147 A1    Jun. 21, 2018

(30) Foreign Application Priority Data
Jun. 19, 2015 (EP) .................................... 15172815

(51) Int. Cl.
| A01N 25/28 | (2006.01) |
| A01N 33/18 | (2006.01) |
| A01N 37/18 | (2006.01) |
| C08G 18/76 | (2006.01) |
| C08G 18/75 | (2006.01) |
| C08G 18/32 | (2006.01) |
| C08L 75/02 | (2006.01) |
| C08G 18/72 | (2006.01) |

(52) U.S. Cl.
CPC ............ *A01N 25/28* (2013.01); *A01N 33/18* (2013.01); *A01N 37/18* (2013.01); *C08G 18/3234* (2013.01); *C08G 18/755* (2013.01); *C08G 18/7642* (2013.01)

(58) Field of Classification Search
None
See application file for complete search history.

(56) References Cited

U.S. PATENT DOCUMENTS

| 4,902,667 A | 2/1990 | Whitecomb et al. |
| 5,925,595 A | 7/1999 | Seitz et al. |
| 8,709,975 B2 | 4/2014 | Cannan et al. |
| 2003/0119675 A1 | 6/2003 | Wolf et al. |
| 2005/0277549 A1* | 12/2005 | Seitz ..................... A01N 25/28 504/359 |
| 2007/0238615 A1 | 10/2007 | Krause et al. |
| 2008/0242548 A1 | 10/2008 | Asrar et al. |
| 2009/0053271 A1 | 2/2009 | Giner et al. |
| 2010/0068299 A1 | 3/2010 | van der Krieken et al. |
| 2010/0248963 A1* | 9/2010 | Becher .................. A01N 37/26 504/127 |
| 2011/0015072 A1* | 1/2011 | Hechavarria Fonseca .................. B01J 13/16 504/227 |
| 2012/0245027 A1 | 9/2012 | Casana et al. |
| 2014/0200141 A1 | 7/2014 | Shroff et al. |

FOREIGN PATENT DOCUMENTS

| WO | 11095859 A1 | 8/2011 |
| WO | WO-2015/022634 | 2/2015 |
| WO | WO-2015/071087 | 5/2015 |
| WO | WO-2015/075167 | 5/2015 |
| WO | WO-2015/144451 | 10/2015 |
| WO | WO-2015/155236 | 10/2015 |
| WO | WO-2015/158565 | 10/2015 |
| WO | WO-2015/169683 | 11/2015 |
| WO | WO-2015/197392 | 12/2015 |
| WO | WO-2015/197487 | 12/2015 |
| WO | WO-2016/041693 | 3/2016 |
| WO | WO-2016/062814 | 4/2016 |
| WO | WO-2016/120355 | 8/2016 |
| WO | WO-2016/128470 | 8/2016 |
| WO | 16169683 A1 | 10/2016 |
| WO | WO-2016/202500 | 12/2016 |
| WO | WO-2016/202659 | 12/2016 |
| WO | 17029302 A1 | 2/2017 |

OTHER PUBLICATIONS inchem.org, alachlor, obtained online at: http://www.inchem.org/documents/icsc/icsc/eics0371.htm (Year: 2010).*

(Continued)

Primary Examiner — Abigail Vanhorn
(74) Attorney, Agent, or Firm — Marshall, Gerstein & Borun LLP

(57) ABSTRACT

The present invention relates to a composition comprising microcapsules, which comprise a polyurea shell and a core, wherein the core comprises a water-insoluble pesticide and the shell comprises a polymerization product of a tetramethylxylylene diisocyanate, an cycloaliphatic diisocyanate, and an aliphatic diamine; to a method for preparing the composition comprising the steps of contacting water, the pesticide, the tetramethylxylylene diisocyanate, the cycloaliphatic diisocyanate, and the aliphatic diamine; and to a method of controlling phytopathogenic fungi and/or undesired plant growth and/or undesired insect or mite attack and/or for regulating the growth of plants, wherein the composition is allowed to act on the respective pests, or the crop plants to be protected from the respective pest, on the soil and/or on undesired plants and/or on the crop plants and/or on their environment.

17 Claims, No Drawings

(56) References Cited

OTHER PUBLICATIONS

International Search Report for PCT/EP2016/060397 dated Jun. 27, 2016.
European Search Report for EP Application No. 15172815.1 dated Aug. 7, 2015.
Office Action, issued in co-pending U.S. Appl. No. 15/736,927, dated May 28, 2019.

* cited by examiner

PESTICIDAL MICROCAPSULES WITH A SHELL MADE OF TETRAMETHYLXYLYLENE DIISOCYANATE, CYCLOALIPHATIC DIISOCYANATE, AND ALIPHATIC DIAMINE

This application is a National Stage application of International Application No. PCT/EP2016/060397, filed May 10, 2016. This application also claims priority under 35 U.S.C. § 119 to European Patent Application No. 15172815.1, filed Jun. 19, 2015.

The present invention relates to a composition comprising microcapsules, which comprise a polyurea shell and a core, wherein the core comprises a water-insoluble pesticide and the shell comprises a polymerization product of a tetramethylxylylene diisocyanate, an cycloaliphatic diisocyanate, and an aliphatic diamine; to a method for preparing the composition comprising the steps of contacting water, the pesticide, the tetramethylxylylene diisocyanate, the cycloaliphatic diisocyanate, and the aliphatic diamine; and to a method of controlling phytopathogenic fungi and/or undesired plant growth and/or undesired insect or mite attack and/or for regulating the growth of plants, wherein the composition is allowed to act on the respective pests, their environment or the crop plants to be protected from the respective pest, on the soil and/or on undesired plants and/or on the crop plants and/or on their environment. The present invention comprises combinations of preferred features with other preferred features.

Agrochemical microcapsules which comprise a polyurea shell and a pesticidal core are known, but still need some improvement. US 2003/119675 discloses a microcapsule suspension, comprising: A) microcapsules, whose shell is made of mixtures of toluylene diisocyanate and methylenebis-(cyclohexyl-4-isocyanate) with one diamine and/or polyamine and a core containing a solid pesticide, a liquid aliphatic hydrocarbon and an oil-soluble polymeric dispersing agent and B) an aqueous phase, which may contain additives and further pesticides in non-encapsulated form. U.S. Pat. No. 5,925,595 discloses a microcapsule with (a) a capsule wall made of: (i) a triisocyanate that is an adduct of linear aliphatic isocyanates; (ii) an aliphatic diisocyanate that contains a cycloalphatic or aromatic ring moiety, and (iii) a polyamine; and (b) a core comprising two different core chemicals. US 2012/245027 discloses a composition comprising microcapsules containing microencapsulated materials (eg. pesticide) having a low solubility in water, wherein a wall of the microcapsules is formed by means of an interfacial polymerization reaction of an aromatic isocyanate, an aliphatic isocyanate and an acetylene carbamide derivative.

The objects were solved by a composition comprising microcapsules, which comprise a polyurea shell and a core, wherein the core comprises a water-insoluble pesticide and the shell comprises a polymerization product of a) a tetramethylxylylene diisocyanate, b) an cycloaliphatic diisocyanate, and c) an aliphatic diamine.

A suitable tetramethylxylylene diisocyanate may be meta- or para-substituted tetramethylxylylene diisocyanate. Preferably the tetramethylxylylene diisocyanate is the compound of formula (II)

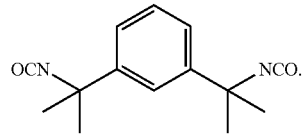

Suitable cycloaliphatic diisocyanates are 1-isocyanato-3,3,5-trimethyl-5-isocyanatomethyl-cyclohexane (isophorone diisocyanate, IPDI), 1,4- and/or 1,3-bis(isocyanatomethyl) cyclohexane (HXDI), cyclohexan-1,4-diisocyanate, 1-methyl-2,6-cyclohexane diisocyanate, 1-methyl-2,4-cyclohexane diisocyanate, 2,2'-dicyclohexylmethane diisocyanate, 2,4'-dicyclohexylmethane diisocyanate, or 4,4'-dicyclohexylmethane diisocyanate. Preferably, the cycloaliphatic diisocyanate is 4,4'-dicyclohexylmethane diisocyanate, which corresponds to the compound of formula (I)

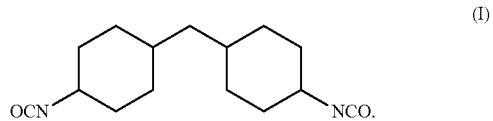

Suitable aliphatic diamine are of the formula $H_2N-(CH_2)_n-NH_2$, wherein n is an integer from 2 to 8 (preferably 4 to 6). Exemplary of such diamines are ethylenediamine, propylene-1,3-diamine, tetramethylenediamine, pentamethylenediamine and hexamethylenediamine. A preferred aliphatic diamine is hexamethylenediamine.

The weight ratio of the tetramethylxylylene diisocyanate to the cycloaliphatic diisocyanate (e.g. the compound of the formula (I)) is usually in the range from 25:1 to 2:1, preferably from 15:1 to 4:1, and in particular from 12:1 to 7:1.

The polyurea shell comprises usually at least 35 wt %, preferably at least 45 wt %, and in particular at least 55 wt % of the tetramethylxylylene diisocyanate. The polyurea shell comprises usually 35 to 85 wt %, preferably 45 to 80 wt %, and in particular 55 to 75 wt % of the tetramethylxylylene diisocyanate. The wt % of the tetramethylxylylene diisocyanate in the polyurea shell may refer to the total amount of monomers.

The polyurea shell comprises usually up to 50 wt %, preferably up to 40 wt %, and in particular up to 35 wt % of the cycloaliphatic diisocyanate (e.g. the compound of the formula (I)). The polyurea shell comprises usually 1 to 30 wt %, preferably 2 to 20 wt %, and in particular 4 to 12 wt % of the cycloaliphatic diisocyanate (e.g. the compound of the formula (I)). The wt % of cycloaliphatic diisocyanate in the polyurea shell may refer to the total amount of monomers.

The polyurea shell comprises usually up to 50 wt %, preferably up to 35 wt %, and in particular up to 30 wt % of the aliphatic diamine (e.g. of the formula $H_2N-(CH_2)_n-NH_2$, wherein n is an integer from 2 to 8). The polyurea shell comprises usually 1 to 50 wt %, 1-30 wt %, preferably 2 to 20 wt % or 15 to 35 wt % and in particular 25 to 35 wt % of the aliphatic diamine (e.g. of the formula $H_2N-(CH_2)_n-NH_2$, wherein n is an integer from 2 to 8). The wt % of aliphatic diamine in the polyurea shell may refer to the total amount of monomers.

The polyurea shell may comprise further polyisocyanates, which have at least two isocyanate groups and which are different from the tetramethylxylylene diisocyanate and from the cycloaliphatic diisocyanate. Usually, the polyurea shell comprises up to 10 wt %, preferably up to 5 wt %, and in particular up to 1 wt % of the further polyisocyanates. The wt % of the further polyisocyanates in the polyurea shell may refer to the total amount of monomers.

The polyurea shell may comprise further polyamines, which have at least two amine groups and which are different from the aliphatic diamine. Usually, the polyurea shell comprises up to 10 wt %, preferably up to 5 wt %, and in particular up to 1 wt % of the further polyamines. The wt % of the further polyamines in the polyurea shell may refer to the total amount of monomers.

The weight ratio of the core to the polyurea shell is usually in the range from 50:1 to 5:1, preferably from 40:1 to 10:1, and in particular from 30:1 to 15:1. The weight of the core may be based on the amounts of the pesticide, and optionally the water immiscible organic solvent, and optionally the further solvents. The weight of the polyurea shell may be based on the amounts of the tetrarnethylxylylene diisocyanate, thr cycloaliphatic diisocyanate, the aliphatic diamine, and optionally the further polyisocyanates, and the further polyamines.

In a preferred form the polyurea shell comprises 35 to 85 wt % of the tetramethylxylylene diisocyanate, 1 to 30 wt % of the cycloaliphatic diisocyanate (e.g. the compound of the formula (I)), 1 to 30 wt % of the aliphatic diamine (e.g. of the formula $H_2N$—$(CH_2)_n$—$NH_2$, wherein n is an integer from 2 to 8), up to 10 wt % of the further polyisocyanates, up to 10 wt % of the further polyamines, and the weight ratio of the tetramethylxylylene diisocyanate to the cycloaliphatic diisocyanate (e.g. the compound of the formula (I)) is in the range from 25:1 to 2:1, and the weight ratio of the core to the polyurea shell is in the range from 50:1 to 5:1.

In another preferred form the polyurea shell comprises 45 to 80 wt % of the tetramethylxylylene diisocyanate, 2 to 20 wt % of the cycloaliphatic diisocyanate (e.g. the compound of the formula (I)), 15 to 35 wt % of the aliphatic diamine (e.g. of the formula $H_2N$—$(CH_2)_n$—$NH_2$, wherein n is an integer from 2 to 8), up to 5 wt % of the further polyisocyanates, up to 5 wt % of the further polyamines, and the weight ratio of the tetramethylxylylene diisocyanate to the cycloaliphatic diisocyanate (e.g. the compound of the formula (I)) is in the range from 15:1 to 4:1, and the weight ratio of the core to the polyurea shell is in the range from 40:1 to 10:1.

In another preferred form the polyurea shell comprises 55 to 75 wt % of the tetramethylxylylene diisocyanate, 4 to 12 wt % of the cycloaliphatic diisocyanate (e.g. the compound of the formula (I)), 25 to 35 wt % of the aliphatic diamine (e.g. of the formula $H_2N$—$(CH_2)_n$—$NH_2$, wherein n is an integer from 4 to 8), up to 1 wt % of the further polyisocyanates, up to 1 wt % of the further polyamines, and the weight ratio of the tetramethylxylylene diisocyanate to the cycloaliphatic diisocyanate (e.g. the compound of the formula (I)) is from 12:1 to 7:1, and the weight ratio of the core to the polyurea shell is in the range from 30:1 to 15:1.

Microcapsules with a polyurea shell can be prepared by analogy to prior art. They are preferably prepared by an interfacial polymerization process of a suitable polymer wall forming material, such as a diisocyanate and a diamine. Interfacial polymerization is usually performed in an aqueous oil-in-water emulsion or suspension of the core material containing dissolved therein at least one part of the polymer wall forming material. During the polymerization, the polymer segregates from the core material to the boundary surface between the core material and water thereby forming the wall of the microcapsule. Thereby an aqueous suspension of the microcapsule material is obtainable. Suitable methods for interfacial polymerization processes for preparing microcapsules containing pesticide compounds have been disclosed in prior art. In general, polyurea is formed by reacting at least one diisocyanate with at least one diamine to form a polyurea shell.

The average size of the microcapsules (z-average by means of light scattering; preferably a $D_{4.3}$ average) is 0.5 to 50 µm, preferably 0.5 to 20 µm, more preferably 1 to 15 µm, and especially 2 to 10 µm.

The core of the microcapsules may comprise a water immiscible organic solvent. Suitable examples for water immiscible organic solvents are
 a hydrocarbon solvent such a an aliphatic, cyclic and aromatic hydrocarbons (e. g. toluene, xylene, paraffin, tetrahydronaphthalene, alkylated naphthalenes or their derivatives, mineral oil fractions of medium to high boiling point (such as kerosene, diesel oil, coal tar oils));
 a vegetable oil such as corn oil, rapeseed oil;
 a fatty acid ester such as $C_1$-$C_{10}$-alkylester of a $C_{10}$-$C_{22}$-fatty acid; or
 methyl- or ethyl esters of vegetable oils such as rapeseed oil methyl ester or corn oil methyl ester
 partly saponified fats and oils
 rosins and rosin oils.
Mixtures of aforementioned water immiscible organic solvents are also possible. The water immiscible organic solvent is usually commercially available, such as the hydrocarbons under the tradenames Solvesso® 200, Aromatic® 200, or Caromax® 28. The aromatic hydrocarbons may be used as naphthalene depleted qualities. Preferred water immiscible organic solvents are hydrocarbons, in particular aromatic hydrocarbons.

Preferably, the water immiscible organic solvent has a solubility in water of up to 20 g/l at 20° C., more preferably of up to 5 g/l and in particular of up to 0.5 g/l.

Usually, the water immiscible organic solvent has a boiling point above 100° C., preferably above 150° C, and in particular above 180° C.

In a preferred form the core of the microcapsule may comprise up to 10 wt %, preferably up to 5 wt %, and in particular up to 1 wt % of the water immiscible organic solvent.

The core of the microcapsules may comprise further solvents, e.g. up to 30 wt %, preferably up to 15 wt %, based on the total amount of all solvents in the core.

The core of the microcapsule may comprise at least 90 wt %, preferably at least 95 wt %, and in particular at least 99 wt % of the sum of the pesticide, optionally the water-immiscible organic solvent, and optionally the further solvent. In another form the core of the microcapsule may consist of the pesticide, optionally the water-immiscible organic solvent, and optionally the further solvent.

In a preferred form the core of the microcapsule may comprise at least 90 wt %, preferably at least 95 wt %, and in particular at least 99 wt % of the pesticide.

The composition may be an aqueous composition, which may comprise an aqueous phase (e.g. a continuous aqueous phase). The aqueous composition may comprise at least 10 wt %, preferably at least 25 wt %, and in particular at least 35 wt % water. Usually, the microcapsules are suspended in the aqueous phase of the aqueous composition.

Preferably, the composition is an aqueous composition and the aqueous phase comprises a lignosulfonate. Lignosulfonates which are suitable are the alkali metal salts and/or alkaline earth metal salts and/or ammonium salts, for example the ammonium, sodium, potassium, calcium or magnesium salts of lignosulfonic acid. The sodium, potassium and/or calcium salts are very particularly preferably used. Naturally, the term lignosulfonates also encompasses mixed salts of different ions, such as potassium/sodium lignosullonate, potassium/calcium lignosulfonate and the like, in particular sodium/calcium lignosulfonate.

The lignosulfonate may be based on kraft lignins. Kraft lignins are obtained in a pulping process of lignins with sodium hydroxyde and sodium sulfide. The kraft lignins may be sulfonated to obtain the lignosulfonate.

The molecular mass of the lignosulfonate may vary from 500 to 20000 g/mol. Preferably, the lignosulfonate has a molecular weight of 700 to 10000 g/mol, more preferably from 900 to 7000 g/mol, and in particular from 1000 to 5000 g/mol.

The lignosulfonate is usually soluble in water (e.g. at 20° C.), e.g. at least 5 wt %, preferably at least 10 wt %, and in particular at least 20 wt %.

The aqueous composition comprises usually 0.1 to 5.0 wt %, preferably 0.3 to 3.0 wt %, and in particular 0.5 to 2.0 wt % of the lignosullonate.

The term pesticide usually refers to at least one active substance selected from the group of the fungicides, insecticides, nematicides, herbicides, safeners, biopesticides and/or growth regulators. Preferred pesticides are fungicides, insecticides, herbicides and growth regulators. Especially preferred pesticides are herbicides. Mixtures of pesticides of two or more of the above-mentioned classes may also be used. The skilled worker is familiar with such pesticides, which can be found, for example, in the Pesticide Manual, 16th Ed. (2013), The British Crop Protection Council, London. Suitable insecticides are insecticides from the class of the carbamates, organophosphates, organochlorine insecticides, phenylpyrazoles, pyrethroids, neonicotinoids, spinosins, avermectins, milbemycins, juvenile hormone analogs, alkyl halides, organotin compounds nereistoxin analogs, benzoylureas, diacylhydrazines, METI acarizides, and insecticides such as chloropicrin, pymetrozin, flonicamid, clofentezin, hexythiazox, etoxazole, diafenthiuron, propargite, tetradifon, chlorofenapyr, DNOC, buprofezine, cyromazine, amitraz, hydramethylnon, acequinocyl, fluacrypyrim, rotenone, or their derivatives. Suitable fungicides are fungicides from the classes of dinitroanilines, allylamines, anilinopyrimidines, antibiotics, aromatic hydrocarbons, benzenesulfonarnides, benzimidazoles, benzisothiazoles, benzophenones, benzothiadiazoles, benzotriazines, benzyl carbamates, carbamates, carboxamides, carboxylic acid diamides, chloronitriles cyanoacetamide oxirnes, cyanoimidazoles, cyclopropanecarboxarnides, dicarboximides, dihydrodioxazines, dinitrophenyl crotonates, dithiocarbamates, dithiolanes, ethylphosphonates, ethylaminothiazolecarboxamides, guanidines, hydroxy-(2-amino)pyrimidines, hydroxyanilides, imidazoles, imidazolinones, inorganic substances, isobenzofuranones, rnethoxyacrylates, methoxycarbamates, morpholines, N-phenylcarbarnates, oxazolidinediones, oximinoacetates, oximinoacetamides, peptidylpyrimidine nucleosides, phenylacetamides, phenylamides, phenylpyrroles, phenylureas, phosphonates, phosphorothiolates, phthalamic acids, phthalimides, piperazines, piperidines, propionamides, pyridazinones, pyridines, pyridinylmethylbenzamides, pyrimidinamines, pyrimidines, pyrimidinonehydrazones, pyrroloquinolinones, quinazolinones, quinolines, quinones, sulfamides, sulfamoyltriazoles, thiazolecarboxamides, thiocarbamates, thiophanates, thiophenecarboxamides, toluamides, triphenyltin compounds, triazines, triazoles. Suitable herbicides are herbicides from the classes of the acetamides, amides, aryloxyphenoxypropionates, benzamides, benzofuran, benzoic acids, benzothiadiazinones, bipyridylium, carbamates, chloroacetamides, chlorocarboxylic acids, cyclohexanediones, dinitroanilines, dinitrophenol, diphenyl ether, glycines, imidazolinones, isoxazoles, isoxazolidinones, nitriles, N-phenylphthalimides, oxadiazoles, oxazolidinediones, oxyacetamides, phenoxycarboxylic acids, phenylcarbamates, phenylpyrazoles, phenylpyrazolines, phenylpyridazines, phosphinic acids, phosphoroamidates, phosphorodithioates, phthalamates, pyrazoles, pyridazinones, pyridines, pyridinecarboxylic acids, pyridinecarboxamides, pyrimidinediones, pyrimidinyl(thio)benzoates, quinolinecarboxylic acids, semicarbazones, sulfonylaminocarbonyltriazolinones, sulfonylureas, tetrazolinones, thiadiazoles, thiocarbamates, triazines, triazinones, triazoles, triazolinones, triazolocarboxamides, triazolopyrimidines, triketones, uracils, ureas. Preferably, the pesticide is a herbicide, such as pendimethalin.

The pesticide is water-insoluble. The pesticide may have solubility in water of up to 10 g/l, preferably up to 1 g/l and in particular up to 0.5 g/l, at 20° C.

The pesticide may be liquid or solid at 20° C., wherein the liquid form is preferred. In one form the pesticide has a melting point from 0 to 120° C., preferably from 20 to 90 and in particular from 35 to 70° C.

The core usually comprises the pesticide in liquid form (e.g. when the core is free of the water immiscible organic solvent; or when the core consists of the pesticide), or dissolved in the water-immiscible organic solvent. Preferably, the core comprises the pesticide in liquid form (e.g. when the core is free of the water immiscible organic solvent; or when the core consists of the pesticide).

The composition (e.g. the aqueous compositor) contains usually at least 1 wt % encapsulated pesticide, preferably at least 3 wt % and in particular at least 10 wt %.

The composition may comprise a non-encapsulated pesticide. This non-encapsulated pesticide may be present in dissolved form, or as a suspension, emulsion or suspoemulsion. It may be identical or different to the pesticide in the core. The aqueous composition may comprise the non-encapsulated pesticide in the aqueous phase. The aqueous composition contains usually at least 1 wt % non-encapsulated pesticide, preferably at least 3 wt % and in particular at least 10 wt %.

The composition may also contain a water-soluble inorganic salt, which may result from the preparation of the microencapsules or which may be added thereafter. If present, the concentration of the water-soluble, inorganic salt may vary from 1 to 200 g/l, preferably from 2 to 150 g/l and especially from 10 to 130 g/l. Water-solubility of the salt means solubility in water of at least 50 g/l, in particular at least 100 g/l or even at least 200 g/l at 20° C.

Such inorganic salts are preferably selected from sulfates, chlorides, nitrates, mono and dihydrogen phosphates of alkali metals, the sulfates, chlorides, nitrates, mono and dihydrogen phosphates of ammonia, chlorides and nitrates of alkaline earth metals and magnesium sulfate. Examples include lithium chloride, sodium chloride, potassium chloride, lithium nitrate, sodium nitrate, potassium nitrate, lithium sulfate, sodium sulfate, potassium sulfate, sodium monohydrogen phosphate, potassium monohydrogen phosphate, sodium dihydrogen phosphate, potassium dihydrogen phosphate, magnesium chloride, calcium chloride, magnesium nitrate, calcium nitrate, magnesium sulfate, ammonium chloride, ammonium sulfate, ammonium monohydrogen phosphate, ammonium dihydrogen phosphate and the like.

Preferred inorganic salts are sodium chloride, potassium chloride, calcium chloride, ammonium sulfate and magnesium sulfate with ammonium sulfate and magnesium sulfate being especially preferred.

In another embodiment, the composition does not contain or contains less than 10 g/l in particular less than 1 g/l of the water-soluble inorganic salt.

The composition may comprise an glycol, such as ethylene glycol, propylene glycol. The composition may comprise from 1 to 250 g/l, preferably from 10 to 150 g/l and especially from 30 to 100 g/l of the glycol.

The composition may comprise further auxiliaries outside the microcapsules, e.g. in the aqueous phase of the aqueous composition. Examples for suitable auxiliaries are surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-foaming agents, antifreeze agents, colorants, tackifiers and binders.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates. The term sulfonates refers to compounds which are different from the ligninsulfonates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-foaming agents are silicones, long chain alcohols, and salts of fatty acids.

Suitable antifreeze agents are urea, ethylene glycol, propylene glycol, glycerol or potassium formate.

The present invention also relates to a method for preparing the composition comprising the steps of contacting water, the pesticide, the tetramethylxylylene diisocyanate, the cycloaliphatic diisocyanate, and the aliphatic diamine. The contacting may be done by mixing the components, e.g. at temperatures from 20 to 100° C.

The present invention furthermore relates to a method of controlling phytopathogenic fungi and/or undesired plant growth and/or undesired insect or mite attack and/or for regulating the growth of plants, wherein the composition according to the invention is allowed to act on the respective pests, their environment or the crop plants to be protected from the respective pest, on the soil and/or on undesired plants and/or on the crop plants and/or on their environment.

Examples of suitable crop plants are cereals, for example wheat, rye, barley, triticale, oats or rice; beet, for example sugar or fodder beet; pome fruit, stone fruit and soft fruit, for example apples, pears, plums, peaches, almonds, cherries, strawberries, raspberries, currants or gooseberries; legumes, for example beans, lentils, peas, lucerne or soybeans; oil crops, for example oilseed rape, mustard, olives, sunflowers, coconut, cacao, castor beans, oil palm, peanuts or soybeans; cucurbits, for example pumpkins/squash, cucumbers or melons; fiber crops, for example cotton, flax, hemp or jute; citrus fruit, for example oranges, lemons, grapefruit or tangerines; vegetable plants, for example spinach, lettuce, asparagus, cabbages, carrots, onions, tomatoes, potatoes, pumpkin/squash or capsicums; plants of the laurel family, for example avocados, cinnamon or camphor; energy crops and industrial feedstock crops, for example maize, soybeans, wheat, oilseed rape, sugar cane or oil palm; maize; tobacco; nuts; coffee; tea; bananas; wine (dessert grapes and grapes for vinification); hops; grass, for example turf; sweetleaf (*Stevia rebaudania*); rubber plants and forest plants, for example flowers, shrubs, deciduous trees and coniferous trees, and propagation material, for example seeds, and harvested produce of these plants.

The term crop plants also includes those plants which have been modified by breeding, mutagenesis or recombinant methods, including the biotechnological agricultural products which are on the market or in the process of being developed. Genetically modified plants are plants whose genetic material has been modified in a manner which does not occur under natural conditions by hybridizing, mutations or natural recombination (i.e. recombination of the genetic material). Here, one or more genes will, as a rule, be integrated into the genetic material of the plant in order to improve the plant's properties. Such recombinant modifications also comprise posttranslational modifications of proteins, oligo- or polypeptides, for example by means of glycosylation or binding polymers such as, for example, prenylated, acetylated or farnesylated residues or PEG residues.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

Various types of oils, welters, adjuvants, fertilizer, or micronutrients, and further pesticides (e.g. herbicides, insecticides, fungicides, growth regulators, safeners) may be added to the agrochemical compositions comprising them as premix or, if appropriate not until immediately prior to use (tank mix). These agents can be admixed with the compositions according to the invention in a weight ratio of 1:100 to 100:1, preferably 1:10 to 10:1.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, in particular from 0.1 to 0.75 kg per ha. In treatment of plant propagation materials such as seeds, e. g. by dusting, coating or drenching seed, amounts of active substance of from 0.1 to 1000 g, preferably from 1 to 1000 g, more preferably from 1 to 100 g and most preferably from 5 to 100 g, per 100 kilogram of plant propagation material (preferably seed) are generally required.

The present invention has various advantages: The composition is stable during storage for a long time, for example even at a wide temperature range; the composition may be applied after dilution with water without clogging the spray nozzles; the composition is stable after dilution with water; the composition may be mixed with various other crop protection products; there is a reduced staining of the equipment, the farmers, or the crop caused by coloured pesticides; the volatility of the pesticide is reduced; the UV sensitivity is reduced; the pesticides is more stable after application to the crop.

The examples below give further illustration of the invention, which is not, however, restricted to these examples.

EXAMPLES

TMXDI: Tetramethyl-m-xylylene diisocyanate, CAS 2778-42-9.

Cyclic Diisocyanate: bis(4-isocyanotocyclohexyl) methane (compound of formula (I)).

Additive A: Sodium salt of naphthalene sulfonate condensate.

Additive B: hydrophobically modified polyacrylate, anionic polymeric dispersant, powder, molecular weight 1-20 kDa, pH 7-8.5 (1 wt % in water).

Lignosulfonate: Sodium salt of lignosullonate, based on Kraft lignin, molecular weight about 3000 g/mol, water-soluble, CAS 68512-34-5, Example 1

The oil phase comprising the pesticide, TMXDI and Cyclic Diisocyanate was added at 65° C. to the water phase (comprising Lignosulfonate, magnesium sulfate heptahydrate) and emulsified using high-shear equipment. After emulsification, the emulsification device was replaced by a low shear stirrer and the hexamethylene diamine was added. Subsequently, the dispersion was smoothly agitated for 30-60 minutes at 60° C. Under stirring the aqueous finish solution comprising Additive A, xanthan gum, a silicon defoamer, and a biocide was added to the capsule dispersion and the pH adjusted to pH 6-8 by addition of acetic acid. The average size of the microcapsules was 6.5 μm.

TABLE 1

| | Amount [g/l] |
|---|---|
| Pendimethalin | 455 |
| TMXDI | 15.05 |
| Cyclic Diisocyanate | 1.67 |
| Hexamethylene diamine | 6.6 |
| Lignosulfonate | 12.5 |
| Additive A | 4.7 |
| Magnesium sulfate | 114 |
| Xanthan gum | 0.45 |
| Silicon defoamer | 0.6 |
| Biocide | 2 |
| Water | Ad 1.0 l |

Example 2

The microcapsules were prepared as in Example 1. The amounts of the components are listed in Table 2. The average size of the microcapsules was 7 μm.

TABLE 2

| | Amount [g/l] |
|---|---|
| Pendimethalin | 455 |
| TMXDI | 15.05 |
| Cyclic Diisocyanate | 1.67 |
| Hexamethylene diamine | 6.6 |
| Lignosulfonate | 12.5 |
| Additive A | 5 |
| 1,2-Propylene glycol | 70 |
| Xanthan gum | 2.5 |
| Silicon defoamer | 5 |
| Biocide | 2 |
| Water | Ad 1.0 l |

Example 3

The microcapsules were prepared as in Example 1. The amounts of the components are listed in Table 3. The average size of the microcapsules was 6.9 μm.

TABLE 3

| | Amount [g/l] |
|---|---|
| Pendimethalin | 455 |
| TMXDI | 15.05 |
| Cyclic Diisocyanate | 1.67 |
| Hexamethylene diamine | 6.6 |
| Lignosulfonate | 12.5 |
| Additive B | 5 |
| Magnesium sulfate | 114 |
| Xanthan gum | 0.45 |
| Silicon defoamer | 0.6 |
| Biocide | 2 |
| Water | Ad 1.0 l |

Example 4

Samples of the microcapsules prepared in Examples 1, 2 and 3 following the procedure as described in Example 1 were tested for dilution stability and for clogging the spray nozzles. The samples were diluted with water to prepare a spray tank mixture suitable for an application rate of 3 L/ha product with 200 L/ha water. The spray tank mixture was circled in a pump circuit over a metal sieve (150 μm). After 1 h, 2 h, 2.5 h and 4 h the circuit was refilled with a fresh spray tank mixture. Then the circling was stopped overnight and kept at room temperature. The next day the circuit was refilled and circled for another hour. At the end the circuit was discharged and the residues on the sieves evaluated. Minor amounts of orange residue was observed, which did not clog the sieve.

Thus, it was demonstrated that the compositions of Examples 1, 2 and 3 may be applied after dilution with water without clogging the spray nozzles, and that the composition is stable after dilution with water.

Example 5

Comparative

The comparative microcapsules were prepared following the procedure as described in Example 1, The amounts of the components are listed in Table 4. Basically, this comparative example was identical with the composition of Example 1 but did not comprise the cyclic diisocyanate.

A sample of the microcapsules prepared in this Example 5 were tested for dilution stability and for clogging the spray nozzles as described in Example 4. After the first 2 h the metal sieve in the pump circuit was clogged due to large amounts of an orange residue. The circling could not be continued.

Thus, it was demonstrated that the comparative composition cannot be applied after dilution with water due to clogging the spray nozzles, and that the comparative composition is not stable after dilution with water.

TABLE 4

|  | Amount [g/l] |
| --- | --- |
| Pendimethalin | 455 |
| TMXDI | 15 |
| Cyclic Diisocyanate | — |
| Hexamethylene diamine | 6 |
| Lignosulfonate | 11 |
| Additive A | 4 |
| Magnesium sulfate | 100 |
| Xanthan gum | 0.4 |
| Silicon defoamer | 0.5 |
| Biocide | 2 |
| Water | Ad 1.0 l |

Example 6

Comparative

The microcapsules were prepared following the procedure as described in Example 1 resulting in a similar average size of the microcapsules. The amounts of the components are listed in Table 5.

For comparison, the recipe in Table 5 was modified by substituting, on a molar basis, the TMXDI by a commercially available isomer mixture of 2,4- and 2,6- toluene diisocyanate (TDI). Attempts to achieve encapsulation in the manner as described in Example 1 failed. After the addition of hexamethylene diamine the viscosity of the resulting aqueous solution increased and a sticky pulp comprising the regular microcapsules as well as large amounts of polymer particles was obtained. The pulp could not be further processed and was discarded.

TABLE 5

|  | Amount [g/l] |
| --- | --- |
| Pendimethalin | 455 |
| TMXDI | 15.05 |
| Cyclic Diisocyanate | 1.67 |
| Hexamethylene diamine | 6.6 |
| Lignosulfonate | 15 |
| Additive A | 12 |
| Additive B | 15 |
| Magnesium sulfate | 120 |
| Xanthan gum | 0.45 |
| Silicon defoamer | 1 |
| Biocide | 2 |
| Water | Ad 1.0 l |

The invention claimed is:

1. A composition comprising microcapsules, which comprise a polyurea shell and a core, wherein the core comprises a pesticide and the shell comprises a polymerization product of
    a) a tetramethylxylylene diisocyanate,
    b) an cycloaliphatic diisocyanate, and
    c) an aliphatic diamine,
wherein:
    the composition is the product of a method comprising reacting the tetramethylxylylene diisocyanate and the cycloaliphatic diisocyanate with the aliphatic diamine in the presence of water and the pesticide, and wherein the pesticide has a solubility in water of up to 10 g/l at 20° C.;
    the composition is an aqueous composition comprising an aqueous phase, and the aqueous phase comprises a lignosulfonate; and
    the core is free from acetamide herbicides.

2. The composition according to claim 1 where the cycloaliphatic diisocyanate is the compound of formula (I)

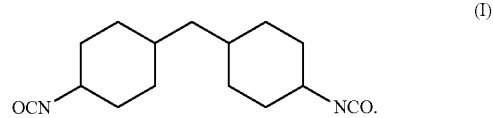

(I)

3. The composition according to claim 1 where the tetramethylxylylene diisocyanate is the compound of formula (II)

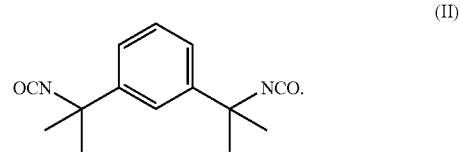

(II)

4. The composition according to claim 1 where the aliphatic di amine is of the formula $H_2N-(CH_2)_n-NH_2$, wherein n is an integer from 2 to 8.

5. The composition according to claim 1 where the weight ratio of the core to the polyurea shell is in the range from 50:1 to 5:1.

6. The composition according to claim 1 where the weight ratio of the tetramethylxylylene diisocyanate to the cycloaliphatic diisocyanate is in the range from 25:1 to 2:1.

7. The composition according to claim 1 where the polyurea shell comprises at least 45 wt % of the tetramethylxylylene diisocyanate.

8. The composition according to claim 1 where the polyurea shell comprises up to 20 wt % of the cycloaliphatic diisocyanate.

9. The composition according to claim 1 where the polyurea shell comprises up to 10 wt % of further polyisocyanates, which have at least two isocyanate groups and which are different from the tetramethylxylylene diisocyanate and from the cycloaliphatic diisocyanate.

10. The composition according to claim 1 where the polyurea shell comprises up to 10 wt % of further polyamines, which have at least two amine groups and which are different from the aliphatic diamine.

11. The composition according to claim 1 where the composition comprises 0.3 to 3.0 wt % of the lignosulfonate.

12. The composition according to claim 1 where the core comprises a water immiscible organic solvent.

13. A method of controlling phytopathogenic fungi and/or undesired plant growth and/or undesired insect or mite attack and/or for regulating the growth of plants, the method comprising applying the composition of claim 1 to one or more of pests, a crop plant to be protected from the pests, soil, undesired plants, and an environment of the crop plants.

14. The composition according to claim 1, where the weight ratio of the core to the polyurea shell is in the range from 40:1 to 10:1.

15. The composition according to claim 1, where the weight ratio of the core to the polyurea shell is in the range from 30:1 to 15:1.

16. The composition according to claim 1, wherein:
the polyurea shell comprises at least 45 wt % of the tetramethylxylylene diisocyanate;
the polyurea shell comprises up to 20 wt % of the cycloaliphatic diisocyanate;
the weight ratio of the tetramethylxylylene diisocyanate to the cycloaliphatic diisocyanate is in the range from 12:1 to 7:1;
the weight ratio of the core to the polyurea shell is in the range from 30:1 to 15:1; and
the composition comprises 0.3 to 3.0 wt % of the lignosulfonate.

17. The composition according to claim 16, wherein:
the cycloaliphatic diisocyanate is the compound of formula (I)

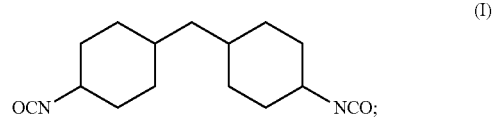

(I)

and
the tetramethylxylylene diisocyanate is the compound of formula (II)

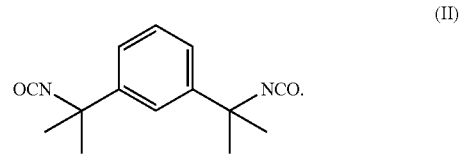

(II)

\* \* \* \* \*